(12) United States Patent
Tanaka et al.

(10) Patent No.: US 11,097,786 B2
(45) Date of Patent: Aug. 24, 2021

(54) VEHICLE FRONT STRUCTURE

(71) Applicant: Toyota Jidosha Kabushiki Kaisha, Toyota (JP)

(72) Inventors: Motoki Tanaka, Toyota (JP); Koji Saeki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 16/531,604

(22) Filed: Aug. 5, 2019

(65) Prior Publication Data
US 2020/0047817 A1 Feb. 13, 2020

(30) Foreign Application Priority Data

Aug. 7, 2018 (JP) .............................. JP2018-148765

(51) Int. Cl.
*B62D 25/14* (2006.01)
(52) U.S. Cl.
CPC .................. *B62D 25/145* (2013.01)
(58) Field of Classification Search
CPC ................................................... B62D 25/145
USPC ........................................ 296/193.02, 193.09
See application file for complete search history.

(56) References Cited

U.S. PATENT DOCUMENTS

2012/0043785 A1  2/2012  Mildner
2015/0145284 A1*  5/2015  Nishida .............. B62D 25/2036
                                              296/187.1

FOREIGN PATENT DOCUMENTS

EP      2361822 A1     8/2011
JP      2005-153801 A  6/2005
JP      2013-159156 A  8/2013

* cited by examiner

*Primary Examiner* — Joseph D. Pape
(74) *Attorney, Agent, or Firm* — Dinsmore & Shohl LLP

(57) ABSTRACT

A vehicle front structure includes a dash panel and a reinforcing member. The dash panel includes a steering column hole. The reinforcing member includes a center reinforcing member mounted in a center portion along a width of a vehicle and an outer reinforcing member attached outward along the width of the vehicle. The center reinforcing member and the outer reinforcing member are superposed and joined together on the dash panel around the steering column hole.

7 Claims, 3 Drawing Sheets

VEHICLE FRONT STRUCTURE

CROSS REFERENCE TO RELATED APPLICATION

This application claims priority to Japanese Patent Application No. 2018-148765 filed on Aug. 7, 2018, which is incorporated herein by reference in its entirety including the specification, claims, drawings, and abstract.

TECHNICAL FIELD

The present disclosure relates to a vehicle front structure including a dash panel.

BACKGROUND

A front portion of a vehicle includes a dash panel that separates a vehicle cabin and a front compartment that houses an engine or a power unit, for example. The dash panel includes through holes including a steering column hole through which a steering column passes and a brake mounting hole to which a brake device is mounted, for example. Portions of the dash panel that include these through holes have lowered rigidity along the length of the vehicle. Therefore, a structure including a reinforcing member extending along the width of the vehicle is proposed to increase rigidity of the dash panel along the length of vehicle (see JP 2013-159156 A, for example).

SUMMARY

With the recent demand for increased crash safety performance, however, the dash panel structure described in JP 2013-159156 A may not have sufficient rigidity along the length of the vehicle.

An embodiment of the disclosure is therefore directed toward further increasing rigidity of the dash panel along the length of the vehicle to thereby enhance crash safety performance.

A vehicle front structure of the disclosure includes a dash panel that separates a vehicle cabin and a front compartment, and a reinforcing member mounted on the dash panel and extending along a width of a vehicle. The dash panel includes a hole through which a component passes. The reinforcing member includes a center reinforcing member mounted in a center portion of the dash panel along the width of the vehicle, and an outer reinforcing member mounted outward of the center reinforcing member along the width of the vehicle. The center reinforcing member and the outer reinforcing member are superposed and joined together on the dash panel around the hole.

The superposed joining portion joining the center reinforcing member and the outer reinforcing member, which is placed around the hole where the dash panel has lowered rigidity, increases rigidity of the dash panel around the hole. This structure reduces deformation of the vehicle cabin even when a power unit retreats toward the portion of the dash panel near the hole in a crash, thereby enhancing crash safety performance.

In the vehicle front structure of the disclosure, the dash panel may include a further hole through which a further component that is different from the component passes, and the center reinforcing member and the outer reinforcing member may be superposed and joined together in a region of the dash panel between the hole and the further hole.

The superposed joining portion joining the center reinforcing member and the outer reinforcing member, which is placed between the two holes where the rigidity is significantly reduced, increases the rigidity of the dash panel between the two holes. This structure reduces deformation of the vehicle cabin even when the power unit retreats toward the portion of the dash panel between the holes in a crash, thereby enhancing crash safety performance.

In the vehicle front structure of the disclosure, the center reinforcing member may be connected to the outer reinforcing member such that the center reinforcing member is superposed on the outer reinforcing member to cover a surface of the outer reinforcing member.

The structure of the disclosure increases rigidity of the dash panel along the length of the vehicle to thereby enhance crash safety performance.

BRIEF DESCRIPTION OF DRAWINGS

An embodiment of the present disclosure will be described by reference to the following figures, wherein.

DESCRIPTION OF EMBODIMENTS

A vehicle front structure 10 according to an embodiment will be described by reference to the drawings. In each drawing, an arrow FR, an arrow UP, and an arrow RH indicate the forward direction (traveling direction), the upward direction, and the rightward direction of a vehicle, respectively. Directions opposite to these arrows FR, UP, and RH indicate the rearward direction, the downward direction, and the leftward direction of the vehicle, respectively. In the following description, unless otherwise specified, frontward and rearward, leftward and rightward, and upward and downward refer to frontward and rearward along the length of a vehicle, leftward and rightward along the width of the vehicle, and upward and downward along the height of the vehicle, respectively. While an example structure of left-hand drive vehicles will be described in the embodiment, the vehicle front structure 10 according to the embodiment is also applicable to right-hand drive vehicles.

Figure 1:
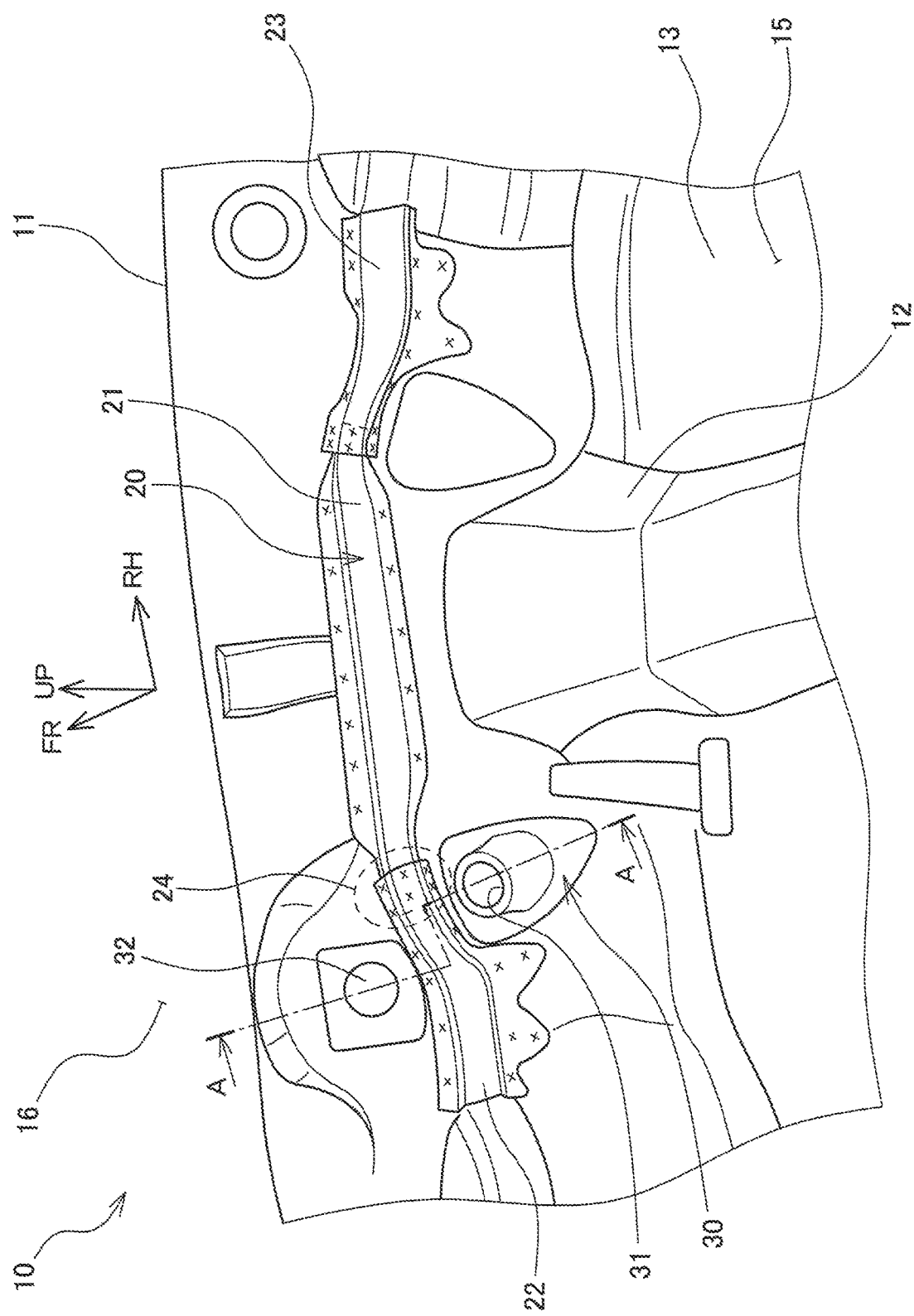
FIG. 1 is a perspective view of a vehicle front structure according to an embodiment as viewed from within a vehicle cabin toward the front of a vehicle.

As illustrated in FIG. 1, the vehicle front structure 10 includes a dash panel 11 and a reinforcing member 20.

The dash panel 11 is a metallic plate member that separates a vehicle cabin 15 and a front compartment 16 that houses an engine or a power unit, for example. The dash panel 11 includes a lower portion connected to a floor panel 13 forming a floor of the vehicle cabin 15. The dash panel 11 further includes a center portion having a lower end connected to a floor tunnel 12 that is raised from the floor panel 13.

A steering wheel, a brake, and other components are mounted on a side of the dash panel 11 facing the vehicle cabin 15. To mount these components, it is necessary to allow members including a steering column 33, for example, illustrated in FIG. 2, to pass through between the vehicle cabin 15 and the front compartment 16. The dash panel 11 therefore includes some through holes including a steering column hole 31 for mounting the steering column 33 and a brake hole 32 for mounting a brake pedal, for example.

Figure 2:
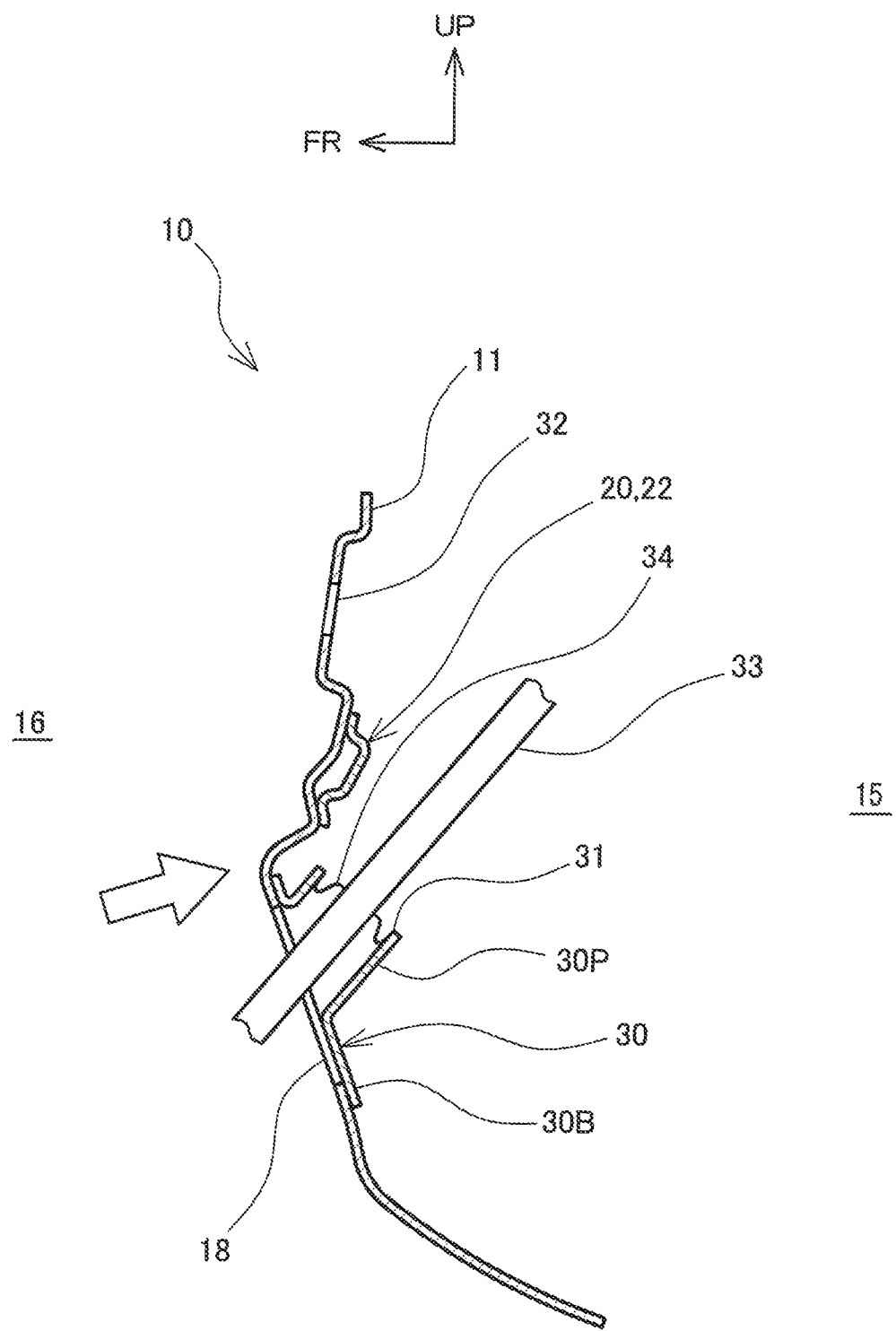
FIG. 2 is a cross sectional view taken along line A-A in FIG. 1.

As illustrated in FIG. 2, the dash panel 11 includes an opening 18 in a portion through which the steering column 33 passes, and a bracket 30 is attached to a portion of the dash panel 11 around the opening 18 on the side facing the vehicle cabin 15. The bracket 30 includes a base 30B fixed to the side of the dash panel 11 facing the vehicle cabin 15, and a pipe 30P attached to a side of the base 30B facing the vehicle cabin 15. The steering column 33 passes through the pipe 30P. Thus, the inner face of the pipe 30P forms the steering column hole 31. The space between the inner face of the pipe 30P and the steering column 33 is sealed with a bellows 34. The steering column hole 31 therefore forms a region where no reinforcement is disposed, and the dash panel 11 has lowered rigidity around the steering column hole 31.

Figure 3:
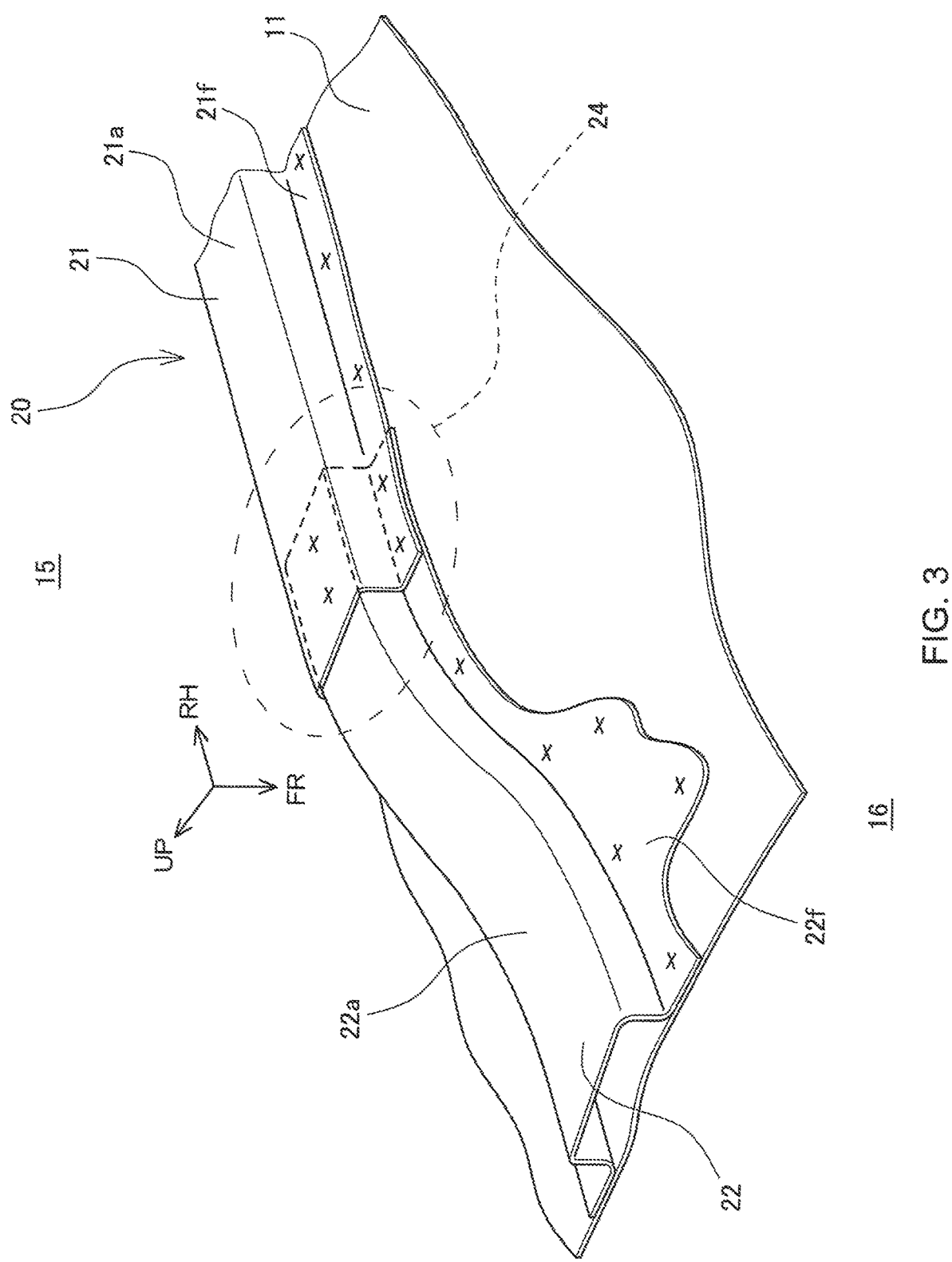
FIG. 3 is a perspective view of a reinforcing member of the vehicle front structure according to the embodiment.

As illustrated in FIG. 1 and FIG. 2, the reinforcing member 20 extending along the width of the vehicle is mounted on the side of the dash panel 11 facing the vehicle cabin 15 above the steering column hole 31 or between the steering column hole 31 and the brake hole 32. The reinforcing member 20 includes a center reinforcing member 21 mounted in the center portion of the dash panel 11 along the width of the vehicle, and outer reinforcing members 22 and 23 mounted outward of the center reinforcing member 21 along the width of the vehicle. In FIGS. 1 and 3, marks "x" indicate spot-weld portions.

The center reinforcing member 21 is mounted in the center portion of the dash panel 11 along the width of the vehicle. A left end of the center reinforcing member 21 in the vehicle width direction extends to a portion of the dash panel 11 above the steering column hole 31. The outer reinforcing members 22 and 23 are mounted on portions of the dash panel 11 outward of opposite ends of the center reinforcing member 21 along the vehicle width. The center reinforcing member 21 is superposed on and joined to the outer reinforcing member 22 around the steering column hole 31 in the dash panel 11. Thus, a joining portion 24 is located around the steering column hole 31. The joining portion 24 joining the center reinforcing member 21 and the outer reinforcing member 22 is also located between the steering column hole 31 and the brake hole 32.

As illustrated in FIG. 3, the center reinforcing member 21 and the outer reinforcing members 22 and 23 are both longitudinal members having a hat-shape cross section. The center reinforcing member 21 includes a channel portion 21a and a flange portion 21f extending along the vehicle height from an end of the channel portion 21a facing the dash panel 11. Similarly, the outer reinforcing member 22 includes a channel portion 22a and a flange portion 22f extending along the vehicle height from an end of the channel portion 22a facing the dash panel 11.

The flange portion 22f of the outer reinforcing member 22 is spot-welded to the side of the dash panel 11 facing the vehicle cabin 15. The center reinforcing member 21 is joined to the outer reinforcing member 22 by spot-welding such that the channel portion 21a and the flange portion 21f located outward in the vehicle width direction of the center reinforcing member 21 are superposed on the surfaces of the channel portion 22a and the flange portion 22f of the outer reinforcing member 22, respectively, to thereby form the joining portion 24. Portions of the flange portion 21f of the center reinforcing member 21 other than the joining portion 24 are spot-welded to the side of the dash panel 11 facing the vehicle cabin 15. The joining portion 24 joining the center reinforcing member 21 and the outer reinforcing member 23 on the right side of the vehicle, which is not illustrated in FIG. 3, has a similar structure.

The thickness of each of the channel portion and the flange portion in the joining portion 24 is greater than the thickness of each of the channel portion and the flange portion in the center reinforcing member 21 and the outer reinforcing members 22 and 23. Therefore, the dash panel 11 has increased rigidity around the joining portion 24 as compared to the related art structure described in JP 2013-159156 A including the integrally formed reinforcing member having a fixed thickness.

As described above, the joining portion 24 formed of the center reinforcing member 21 and the outer reinforcing member 22 which are superposed together is located around the steering column hole 31 or between the steering column hole 31 and the brake hole 32 where the strength of the dash panel 11 is significantly reduced, so that the dash panel 11 can have increased rigidity around each of the holes 31 and 32. Consequently, even when the power unit retreats toward the portion of the dash panel 11 above the steering column hole 31 or toward the portion between the steering column hole 31 and the brake hole 32 in a crash, as indicated by a blank arrow in FIG. 2, deformation of the dash panel 11 and the vehicle cabin 15 can be reduced. This further increases crash safety performance.

While in the embodiment described above, the center reinforcing member 21 is superposed over the outer reinforcing members 22 and 23 for joining, the outer reinforcing members 22 and 23 may be superposed over the center reinforcing member 21 for joining.

The invention claimed is:

1. A vehicle front structure comprising:
   a dash panel that separates a vehicle cabin and a front compartment; and
   a reinforcing member mounted on the dash panel, the reinforcing member extending along a width of a vehicle, wherein
   the dash panel comprises a hole through which a component passes and a further hole through which a further component passes, the further component is different from the component,
   the reinforcing member includes a center reinforcing member mounted in a center portion of the dash panel along the width of the vehicle, an outer reinforcing member mounted outward of the center reinforcing member along the width of the vehicle, and a joining portion joining the center reinforcing member and the outer reinforcing member,
   the center reinforcing member and the outer reinforcing member are superposed and joined together at the joining portion, the joining portion is located in a region of the dash panel between the hole and the further hole, and the joining portion is located inward of either of the hole or the further hole along the width of the vehicle, and
   the further hole is located higher on the dash panel than the reinforcing member along a height of the vehicle.

2. The vehicle front structure according to claim 1, wherein
   the center reinforcing member is connected to the outer reinforcing member such that the center reinforcing member is superposed on the outer reinforcing member to cover a surface of the outer reinforcing member.

3. A vehicle front structure comprising:
   a dash panel that separates a vehicle cabin and a front compartment; and
   a reinforcing member mounted on the dash panel, the reinforcing member extending along a width of a vehicle, wherein the dash panel comprises a steering column hole through which a steering column passes, the reinforcing member includes a center reinforcing member mounted in a center portion of the dash panel along the width of the vehicle, and an outer reinforcing member mounted outward of the center reinforcing member along the width of the vehicle, the reinforcing member is located above the steering column hole in a height of the vehicle, and the center reinforcing member and the outer reinforcing member are superposed and joined together on the dash panel.

4. The vehicle front structure according to claim 3, wherein the dash panel comprises a further hole through which a further component that is different from the steering column passes, and the center reinforcing member and the outer reinforcing member are superposed and joined together in a region of the dash panel between the steering column hole and the further hole.

5. The vehicle front structure according to claim 3, wherein the center reinforcing member is connected to the outer reinforcing member such that the center reinforcing member is superposed on the outer reinforcing member to cover a surface of the outer reinforcing member.

6. The vehicle front structure according to claim 3, wherein the center reinforcing member and the outer reinforcing member are superposed and joined together on the dash panel adjacent the steering.

7. The vehicle front structure according to claim 3, wherein the center reinforcing member and the outer reinforcing member are superposed and joined together on the dash panel above the steering hole along the height of the vehicle.

* * * * *